United States Patent Office 2,908,151
Patented Oct. 13, 1959

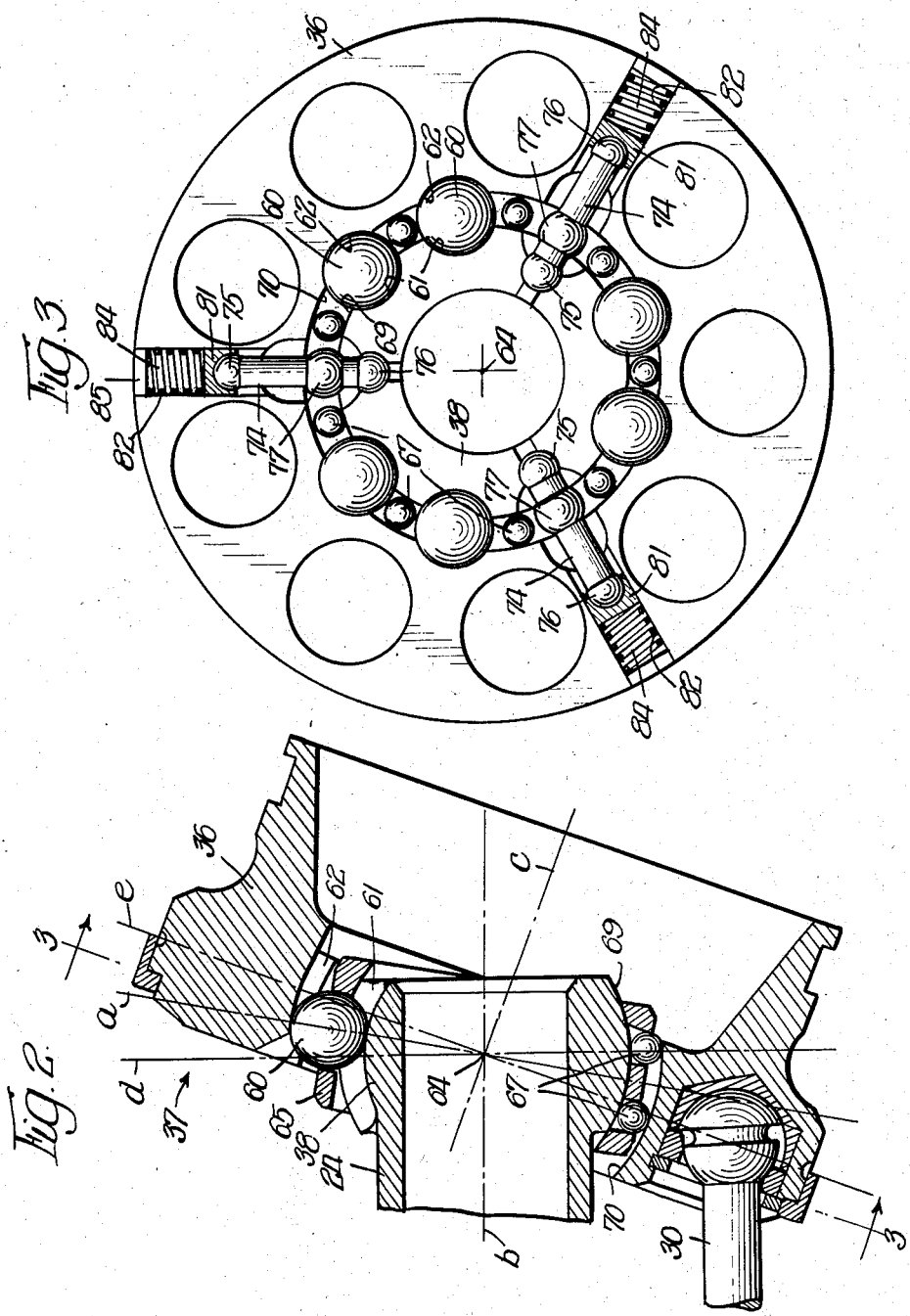

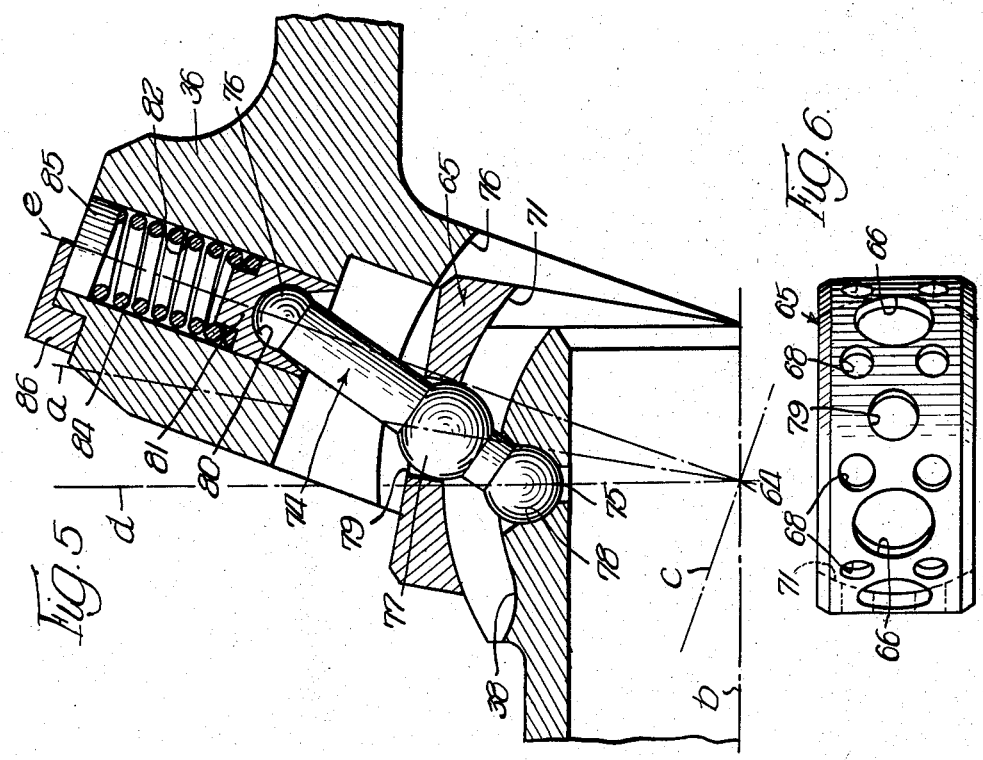
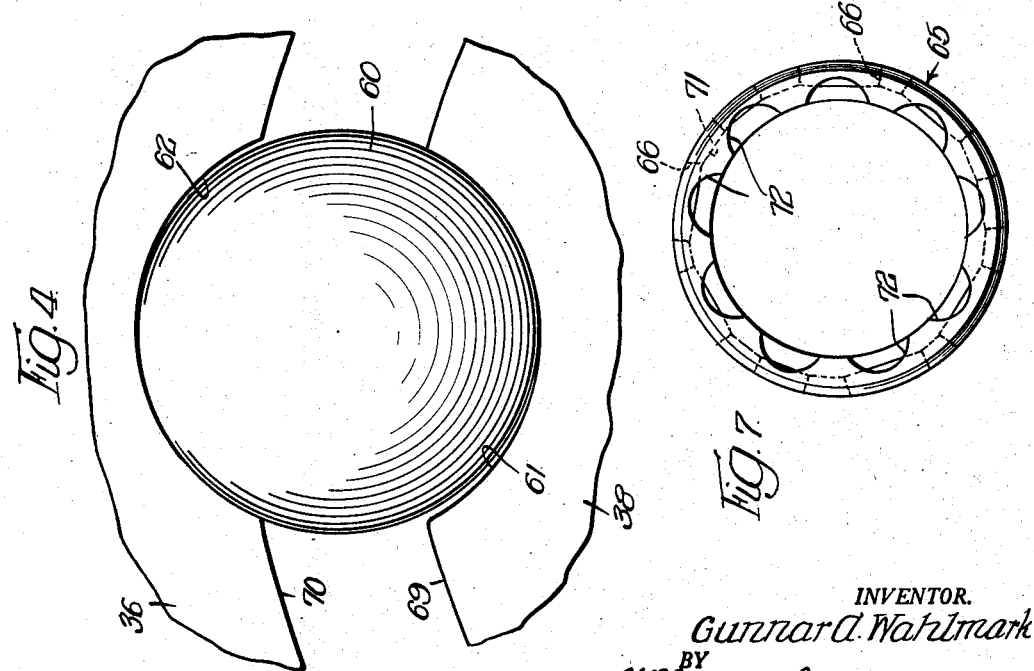
INVENTOR.
Gunnar A. Wahlmark

2,908,151
CONSTANT SPEED DRIVE
Gunnar A. Wahlmark, Rockford, Ill.
Application September 25, 1956, Serial No. 611,842
10 Claims. (Cl. 64—21)

This invention relates to constant speed drive mechanism utilizing swash plate hydraulic power transmission means. More particularly, the invention relates to constant velocity universal joints utilized for coupling swash plate hydraulic power transmission means with the drive and driven shafts of constant speed drive mechanism.

Constant speed drives are utilized for translating variable speed rotation of a drive shaft, motivated by a prime mover, into a constant speed rotation of a driven shaft. Such constant speed drives are commonly used in a wide variety of applications, such as for driving aircraft accessories, particularly constant speed alternators in jet aircraft. As a specific example, a thirty horsepower continuous duty alternator may be designed to be driven at a constant speed of 6,000 r.p.m. (revolutions per minute) for all operational speeds of a jet engine, varying from 2,000 r.p.m. to 9,000 r.p.m. Therefore, the constant speed drive coupling the jet engine to the alternator must be capable of overdriving the alternator at low engine speeds and underdriving the alternator at high engine speeds, and the alternator speed must be kept absolutely constant for all practical purposes under all operational conditions of the engine.

The constant speed drive of the present invention utilizes an axial swash plate variable displacement hydraulic pump connected for driving an axial swash plate fixed displacement hydraulic motor. The swash plate of the pump and the swash plate of the motor are connected to the drive and driven shafts, respectively, of the constant speed device through improved constant velocity universal joints. For purposes herein a "swash plate" hydraulic device is considered to be one in which the obliquely mounted plate which actuates or is actuated by the pistons is universally connected to the drive or driven shaft and the pistons and the plate rotate together. Such a device is still considered to be a swash plate device even though the plate may also "wobble" with respect to a stationary casing.

Until recently all commonly used universal joints were of the Cardan type embodying a spider having two pairs of trunnions formed at right angles with one pair pivotally connected to each of the shafts. It is commonly known that such conventional universal joints do not transmit uniform velocity from the drive to the driven shaft but instead provide two accelerations and decelerations of speed of the driven shaft for each rotation of the drive shaft. While the average speed of rotation of the driven shaft is equal to that of the drive shaft, the periodic fluctuations in speed cause serious vibrational problems which increase drastically as the angularity between the shafts is increased. For example, the maximum speed variation with a conventional universal joint is approximately 3% at a 10° angularity between the shafts while at 30° angularity this variation jumps to approximately 29%.

In order to provide a universal joint in which the driven shaft speed is at all times exactly the same as the drive shaft speed, it is necessary that all driving connection between the drive shaft and the driven shaft take place in a plane which is perpendicular to the plane defined by the axes of the shafts and which bisects the angle between the shafts. This plane will hereafter be referred to as the "constant velocity plane." In recent years a number of constant speed universal joints have been developed utilizing various means for providing drive contact between the drive and driven shaft in the constant velocity plane. Commonly, such devices incorporate ball bearing drive elements which are at all times maintained in the constant velocity plane and provide the driving contact between the shafts. Constant velocity universal joints of this type have been subject to a number of disadvantages which are eliminated by the present invention.

The speed variations encountered with conventional universal joints are completely unacceptable in driving accessories such as aircraft alternators. Recently developed constant velocity universal joints have not been satisfactory in such applications because of undue friction, lack of thrust capacity, bulk, complication, etc. As a result, constant speed alternator drives have utilized wobble plate hydraulic devices rather than swash plate devices. However, such wobble plate devices introduce various disadvantages, such as complication of control, limitation of range, and vibration.

It is an object of the present invention to provide an improved constant speed drive.

Another object is to provide a swash plate type constant speed drive in which the swash plate hydraulic mechanism is connected to the drive and driven shafts through improved constant velocity universal joints.

A further object of the invention is to provide a simplified and improved constant velocity universal joint.

An additional object is to provide a constant velocity universal joint incorporating improved means for maintaining the drive elements of the joint in the constant velocity plane.

Still another object of the invention is to provide a constant velocity universal joint in which friction is substantially reduced.

A still further object of the invention is to provide a joint of this character including improved means for centering the drive portions of the shafts.

An important object of the invention is to provide a constant velocity universal joint capable of accommodating substantial thrust between the shafts in either direction.

Another object of the invention is to provide a joint of this type embodying two separate means for maintaining the drive elements in the constant speed plane.

A still further object of the invention is to provide a constant velocity universal joint in which sliding friction between the drive and driven shafts is virtually eliminated.

Other objects, features and advantages will be apparent from the following detailed description taken in combination with the accompanying drawings, in which;

Figure 2 is an enlarged fragmentary sectional view of a constant velocity universal joint utilized in the constant speed drive of Figure 1;

Figure 3 is a sectional view taken along line 3—3 of Figure 2 but with the shafts shown coaxial;

Figure 4 is a further enlarged fragmentary sectional view showing the relationship of one of the drive elements with portions of the drive and driven shafts;

Figure 5 is an enlarged fragmentary sectional view of one of the auxiliary positioning fingers for maintaining the drive elements in the constant speed plane;

Figure 6 is a top view of the retainer for the drive elements; and

Figure 7 is a plan view of the retainer shown in Figure 6.

Figure 1:
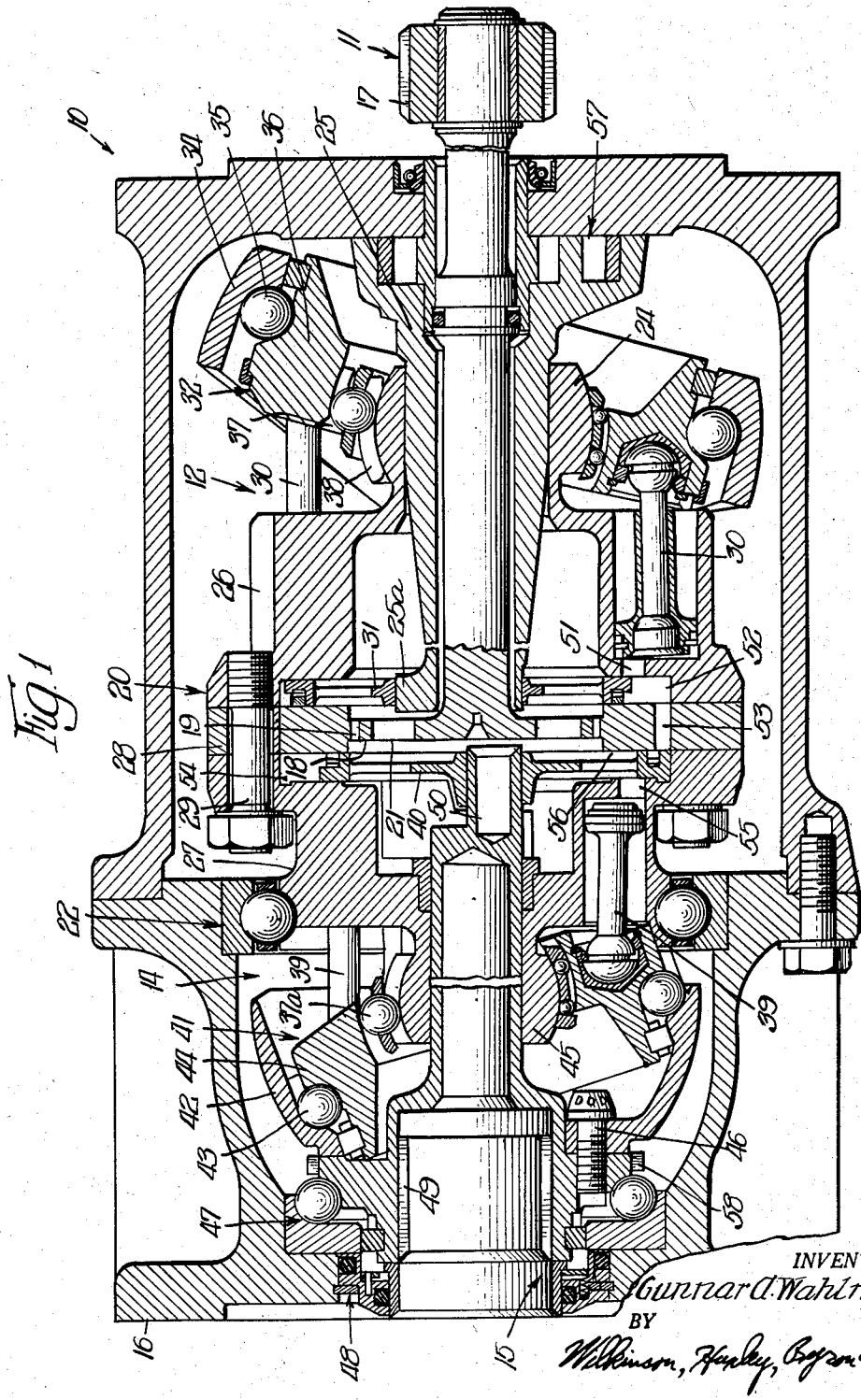
Figure 1 is a longitudinal sectional view of a constant speed drive according to the present invention.

In Figure 1 is illustrated a constant speed drive according to the present invention, generally designated by the reference numeral 10. The constant speed drive includes, in part, a drive shaft 11, a variable displacement swash plate hydraulic pump 12, a fixed displacement swash plate hydraulic motor 14, and a driven shaft 15, housed in a casing or housing 16.

The drive shaft 11 is provided with external drive splines 17 adapted for engaging with the accessory drive of an aircraft jet engine, for example (not shown). The drive shaft is rotatably supported at one end of the casing 16 in any suitable manner, and the opposite end of the shaft is formed with an integral radially extending drive flange 18, having peripheral splines 19 disposed in driving engagement with internal splines formed on a rotatable piston block body 20. The flange 18 is provided with a plurality of openings 21 to permit free passage of hydraulic fluid.

The piston block body 20 is rotatably supported in the casing by means of an antifriction bearing 22 and a plane bearing sleeve 24 which rides on a portion of a stationary shaft 25 fixedly secured in the casing 16. The piston block body 20 includes a primary or pump piston block 26 and a secondary or motor piston block 27, the former constituting a portion of the pump 12 and the latter being a portion of the motor 14. The two main portions of the piston block body are abutted against the opposite sides of a central drive portion 28, and all three portions are fixedly secured by attachment means such as bolts 29.

The swash plate hydraulic pump 12 includes the piston block portion 26, a plurality of reciprocable pistons 30, a stationary face valve 31 and a swash plate assembly 32. The face valve 31 is eccentrically located on an eccentric inner end 25a of the stationary shaft 25. The shaft portion 25a is shown broken from the main portion and rotated ninety degrees for ease of illustration. The swash plate assembly 32 includes an outer tiltable control ring 34 connected by antifriction bearing means 35 to a rotatable piston ring 36. The control ring 34 is mounted in the casing on suitable bearing means (not shown) for tilting about an axis perpendicular to the drive shaft 11 and perpendicular to the view shown in Figure 1.

A constant velocity universal joint 37 according to the present invention universally pivotally connects the piston ring 36 with a drive ring 38 which may be integral with the bearing sleeve portion 24 of the piston block body 20.

The swash plate hydraulic motor 14 includes the piston block portion 27, a plurality of pistons 39, an oscillatable face valve 40, and a swash plate assembly 41. The swash plate assembly 41 includes a fixed tilt outer ring 42 connected by means of an antifriction bearing 43 to a driven ring 44.

A constant velocity universal joint 37a universally pivotally connects the driven ring 44 to a stub shaft portion 45 formed on the left end of piston block body 20, as seen in Figure 1.

The fixed tilt ring 42 of the swash plate assembly 41 is fixedly connected to the driven shaft 15 by attachment means such as bolts 46, and the driven shaft is rotatably mounted in the casing 16 by antifriction bearing means 47. Rotatable seal means 48 provide a seal about the outer end of the driven shaft to prevent escape of hydraulic fluid from the casing. The driven shaft is formed with internal splines 49 for connecting to a device to be driven, such as a jet engine alternator (not shown).

The oscillatable face valve 40 of the motor 14 is rotatably mounted on an eccentric stub shaft 50 formed at the inner end of the driven shaft 15. The driven shaft portion containing the stub shaft 50 is shown broken from the main portion and rotated ninety degrees for ease of illustration. As the driven shaft is rotated relative to the drive shaft 11 and the piston block body 20, the face valve 40 is oscillated eccentrically in accordance with the relative speed between the shafts.

To provide a medium for power flow between the pump 12 and the motor 14, the interior of the piston block body is completely filled with a liquid such as hydraulic fluid or oil.

In operation of the device as thus far described, rotation of the drive shaft 11 at any speed within a given range, such as 2,000 r.p.m. to 9,000 r.p.m., will cause constant speed drive of the driven shaft 15 at 6,000 r.p.m., for example. The drive shaft 11 rotates the swash plate assembly 32 through the constant velocity universal joint 37 to actuate the pump 12 and to cause transfer of hydraulic power between the pump 12 and the motor 14. When the swash plate assembly 32 is tilted as shown in Figure 1, the constant speed device is in the overdrive condition so that the pump 12 transmits hydraulic power to the motor 14 to "overdrive" the motor ring 42 and the driven shaft 15 with respect to the drive shaft. When the swash plate assembly 32 is tilted in the opposite direction, the constant speed device is in the underdrive condition so that the motor 14 feeds back hydraulic power to the pump 12 and the motor ring 42 and the driven shaft 15 are "underdriven" with respect to the drive shaft. Suitable control means (not shown) are provided for controlling the angle and direction of tilt of the swash plate assembly 32 so that the speed of rotation of the drive shaft 15 remains at 6,000 r.p.m. regardless of the speed of rotation of the driven shaft, within the operational range.

In the overdrive condition, rotation of the tilted swash plate assembly 32 causes reciprocable pumping action of the pistons 30 to induce a flow of hydraulic fluid under pressure through pump ports 51 into an outer pump manifold 52 which feeds through ports 53 into an outer motor manifold 54 which, in turn, communicates through motor ports 55 with motor pistons 39 which are on the power stroke to actuate these pistons. Flow from the pump 12 to the motor 14 is controlled by the eccentrically mounted face valve 31 of the pump and the eccentrically oscillatable face valve 40 of the motor so that the pistons 30 of the pump which are on the pump stroke are connected with the pistons 39 of the motor which are on the power stroke. Exhaust flow from the motor to the pump passes back through the motor ports 55 of the motor pistons which are on the exhaust stroke into an inner manifold 56, which communicates through the pump ports 51 with the pump pistons which are on the return stroke.

During the underdrive condition when the drive shaft 11 is rotated faster than 6,000 r.p.m., the swash plate assembly 32 is tilted the opposite direction from that shown in Figure 1 and the hydraulic flow is in a direction opposite to that described above in the overdrive condition so that, in effect, there is a feed back of hydraulic power from the motor to the pump so that the driven shaft maintains its constant speed of 6,000 r.p.m.

It will be understood that when the drive shaft speed is exactly 6,000 r.p.m., the swash plate assembly 32 is perpendicular to the drive shaft 11 so there is no hydraulic power flow between the pump and the motor, and a direct drive to the driven shaft 15 is provided.

The direction and angle of tilt of the swash plate assembly 32, and consequently the displacement of the pump 12, are automatically controlled in any satisfactory manner such as through hydraulic tilting mechanism (not shown) which is connected for tilting the control ring 34 in either direction within the range provided for. An internal-gear control pump 57 is arranged for being driven by the drive shaft 11, and the pressure output from the control pump is directed to the hydraulic tilting mechanism in any suitable manner (not shown). A driven shaft governor (not shown), which may be driven through external gear teeth 58 formed on a portion of the driven shaft 15, is provided and is arranged in any suitable manner (not shown), to control delivery of pressure fluid from the control pump 57 to the hydraulic tilting mechanism, so that the swash plate assembly 32 is maintained at whatever angle is necessary to maintain constant driven shaft speed as sensed by the governor.

In Figures 2–7 the constant velocity universal joint of this invention is illustrated in detail. The joint 37 is illustrated in these figures but the joint 37a is exactly the same except for size and formation of the connecting parts.

The joint 37 comprises, in general, an inner drive member, which in this case is the drive ring 38, and an outer driven member, which is the piston ring 36. It will be understood that either the inner or the outer ring can be utilized as the drive member, depending upon the arrangement.

Between the drive ring 38 and the piston ring 36 a plurality of antifriction drive elements or drive ball bearings 60 are disposed. Six such drive balls are provided and each rides in a path of complementary segmental arcuate grooves 61 and 62 formed in the rings 38 and 36, respectively. The grooves 61 and 62, when seen in cross section as in Figures 3 and 4, form portions of substantially the same circles, the diameters being approximately the same as the diameters of the antifriction drive balls 60 but slightly larger in order to prevent binding. The maximum clearance when the balls are driving, as seen in Figure 4, may be approximately four thousandths of an inch, but the exact clearance is not critical. The grooves 61 and 62 are formed on circular arcs about a common center 64, as best seen in Figure 2. As seen in Figure 3, the grooves are provided in spaced positions in a circle about the center 64.

When the drive balls 60 are disposed in the grooves 61 and 62 as shown, they provide an antifriction driving connection between the rings 38 and 36.

In order that a constant velocity drive be achieved between the drive ring 38 and the piston ring 36 when their axes are at an angle, it is necessary that the centers of the drive balls 60 be maintained in the constant velocity plane (perpendicular to the plane determined by the axes of the two rings and bisecting the angle formed between the axes), designated by the reference letter "a" in Figures 2 and 5. The axes of the rings 38 and 36 are designated by the reference letters "b" and "c," respectively, and planes perpendicular to the axes and passing through the center 64 are designated by the reference letters "d" and "e," respectively. The drive balls 60 are retained in a bearing cage or retainer 65 which is of generally annular form and is provided with a plurality of spaced apertures 66 which retain the drive balls in a single plane in the spaced positions determined by the grooves 61 and 62. The apertures 66 are slightly oval with diameters substantially the same as the diameters of the drive balls 60 in an axial direction relative to the retainer, but slightly larger diameters are provided in the direction of the circumference of the retainer. Thus, approximately ten thousandths of an inch play is allowed in the direction of driving in order to accommodate the clearance illustrated in Figure 4 and to eliminate any chance of binding in the retainers.

In order to guide the retainer so that the centers of the drive balls are always in the constant velocity plane (sometimes referred to as "timing the retainer") and so that the drive ring 38 and the piston ring 36 are always accurately universally centered about the center 64, a plurality of antifriction guide elements are provided in the form of guide ball bearings 67. The guide balls 67 are retained in apertures 68 formed in the retainer 66, which retain the balls loosely but with very little play. The apertures 68 are spaced between the apertures 66 in two planes which are parallel to the plane determined by the centers of the apertures but equally spaced on each side thereof. Thus, when a joint is assembled each guide ball 60 is surrounded by four guide balls 67.

The guide balls 67 are disposed for antifriction rolling on respective conjoint segmental spherical surfaces 69 and 70 formed on the outer surface of the drive ring 38 and within the piston ring 36, respectively. The surfaces 69 and 70 are formed on the lands between the grooves 61 and 62, as best seen in Figures 3 and 4, and have a common spherical center at 64.

Since the guide balls 67 are disposed in two separate planes spaced from the constant speed drive plane, they universally support the drive ring 38 within the piston ring 36, and when accurately fitted they prevent any axial shifting of the rings with respect to each other. This is readily apparent in Figure 2 wherein each of the guide balls 67 is seen to be "up hill" on the spherical surfaces with respect to the constant speed drive plane, on each side thereof. Thus, axial shifting is positively and accurately prevented while antifriction, universal pivoting of the rings is provided.

The guide ball bearings 67 may be fitted with no clearance, or even interference fitted, in order to insure absolute accuracy in location of the rings at all times and to accommodate large axial thrust loads in either direction. Since the guide balls 67 are antifriction elements and roll on their contacting surfaces, no-clearance or interference fit adds very little friction. In any event, the guiding or centering friction is drastically less than the sliding friction which would be introduced if the rings 38 and 36 were guided and supported on spherical plain bearing surfaces. Furthermore, it would be impractical to provide no-clearance or interference fitted plain bearing support since this would cause extreme friction loss or seizing.

The retainer 65 is positioned on the drive ring 38 by forming the retainer with an internal segmental spherical surface 71 which is freely fitted on the spherical surfaces 69 of the ring 38. In order to permit assembly of the retainer on the drive ring a plurality of internal assembly notches 72 are formed in one side of the retainer in spaced positions between the guide ball apertures 68. These grooves permit assembly and disassembly of the guide ring within the retainer only when the two elements are rotated relative to one another so that the lands of the drive ring formed between the grooves 61 line up with the notches 72. These assembly notches have no adverse effect on the operation of the device when assembled since the notches are spaced adjacent the drive ring grooves 61 when the joint is assembled. It will be seen that the assembly notches solve what would otherwise be an extremely difficult assembly problem which would preclude forming the drive ring 38 integral with the sleeve 24.

If the guide balls 67 and the spherical surfaces 69 and 70 were formed with absolute accuracy, the guide balls 67 would always properly time or position the retainer 65 with the centers of the drive ball apertures 66 exactly in the constant speed drive plane. Even if the elements are not completely accurate, as long as the joint is being rotated this positioning is accurately performed.

In practice, the elements are not perfect and under certain conditions where the angle of the axis is changed while the joint is still, it is possible for the retainer to deviate from the constant velocity plane sufficiently to cause binding of the drive balls. Consequently, additional retainer guiding or timing means are provided in the form of three radially disposed guide fingers 74. The guide fingers 74 are formed with segmental spherical surfaces 75 at their inner ends, segmental spherical surfaces 76 at their outer ends, and segmental spherical surfaces 77 in their central portions. The three guide fingers are disposed in circumferentially equally spaced relation in positions which would otherwise be occupied by three drive balls 60. The inner segmental spherical surfaces 75 are disposed in mating segmental spherical sockets 78 formed in the drive ring 38, and the central segmental spherical surfaces 77 are disposed in circular guide finger apertures 79 formed in the retainer 65 in positions which would otherwise be provided with drive ball apertures 66. The outer segmental spherical surfaces 76 are disposed in mating segmental spherical sockets 80 formed in shiftable socket members 81 which are reciprocably disposed in close fitting, radially extending cylindrical apertures 82. The socket members 81 are resiliently urged against the guide fingers 74 by means of compression springs 84 disposed in compressed relation in each of the cylindrical bores 82 between the socket members and outer spring seat members 85. The spring seat members are held in place by an annular retainer ring 86 secured about the outer peripheral portion of the piston ring 36.

The distances from the spherical centers of the segmental spherical surfaces 75 and 76 with respect to the segmental spherical surfaces 77 and the distances between the spherical surfaces 75 and the joint spherical center 64 are arranged such that a line between the spherical center of the surface 77 and the joint spherical center 64 exactly bisects the angle formed between the axes of the rings 38 and 36 when these axes have achieved their maximum design angularity. Thus, at maximum angularity the retainer 65 is positioned so that the centers of the drive balls 60 are retained exactly in the constant velocity plane. At a lesser angularity between the rings the angularity between the axes is not exactly bisected but the inaccuracy is so slight that it has no practical effect in the operation of the joint and in the function of the guide fingers 74. This is readily seen since the most critical position with respect to constant velocity drive is at the maximum design angularity between the shafts and as the angularity decreases, the effect of very slight deviation from the constant speed plane becomes less acute. For all practical purposes the auxiliary guiding effect performed by the guide fingers 74 maintains the drive balls 70 in the constant velocity plane at all times.

In an actual embodiment of the joint of this invention having a maximum design angularity of 20°, the distance from the center of the spherical surface 77 to the center of the spherical surface 75 is .183 inch, the distance from the center of the spherical surface 77 to the center of the spherical surface 76 is .366 inch and the distance between the center of the spherical surface 75 and the spherical center 64 of the joint is .425 inch. In this device the auxiliary guiding effect of the fingers 74 is for al practical purposes absolutely accurate. Of course, the dimensions and angularity can be changed to accommodate the conditions to be encountered.

The provision of auxiliary guide fingers 74 of the character and located in the manner described provides accurate guiding of the retainer in the constant velocity plane, achieving increased accuracy and stability because of the three position support. At the same time the peripheral location allows formation of an open center through the joint as shown to allow insertion of a shaft, passage of lubricants, and pressure equalization on both sides of the joint.

It will be readily understood from the foregoing description that the present invention provides an improved constant speed drive making use of swash plate hydraulic mechanism connected to a drive shaft and a driven shaft through constant velocity universal joints in order to achieve accurately constant speed and to provide an extremely compact construction. The improved constant velocity universal joints employed embody a number of advantages over other types of joints in the incorporation of antifriction drive element timing or guiding means and joint centering means which achieve almost perfect accuracy in positioning of the drive and driven members and allow for increased tolerance fitting of the antifriction drive elements. The antifriction guide elements also accommodate considerable end thrust in the joint in either direction, eliminate binding or seizing, and greatly simplify lubrication. In addition, the improved joint of this invention is provided with auxiliary guiding fingers which prevent misalignment of the drive element plane even when thte joint axes are shifted under no load conditions in the joint, and the multi-position location of these guide fingers achieves more accurate and stable retainer guiding while providing for an open center through the joint.

Variations may be effected without departing from the scope of the novel concepts of the present invention.

I claim:

1. A constant velocity universal joint comprising a drive member, a driven member, antifriction drive elements universally connecting said members for concurrent rotation on normally different axes, retainer mechanism spacing said drive elements in a single plane, antifriction centering elements retained in spaced relation by said retainer and operatively associated with said members for universally centering said members and for guiding said retainer to maintain said single plane perpendicular to the plane defined by the axes of said members bisecting the angle formed by the axes, and positive centering means operatively associated with said retainer mechanism for maintaining said single plane generally perpendicular to the plane defined by the axes of said members and bisecting the angle formed by the axes.

2. A constant velocity universal joint comprising a drive member, a driven member, antifriction drive elements universally connecting said members for concurrent rotation on normally different axes, antifriction means for universally centering said members and for maintaining said drive elements in a single plane perpendicular to the plane defined by the axes of said members bisecting the angle formed by the axes, and positive centering means operatively associated with said drive elements and said antifriction means for acting in conjunction with said antifriction means to maintain said drive elements in said single plane perpendicular to the plane defined by the axes of said members and bisecting the angle formed by said axes.

3. A constant velocity universal joint comprising a drive member, a driven member, antifriction drive elements universally connecting said members for concurrent rotation on normally different axes, retainer mechanism spacing said drive elements in a single plane, antifriction centering elements retained in spaced relation by said retainer and operatively associated with said members for universally centering said members, said antifriction centering members being adapted to maintain said single plane perpendicular to the plane defined by the axes of said members and bisecting the angle formed by said axes, and at least three guide fingers each having a central portion universally pivotally journalled in said retainer in said single plane and end portions universally pivotally journalled in the respective members for guiding said retainer in conjunction with said antifriction centering elements to maintain said single plane perpendicular to the plane defined by the axes of said members and bisecting the angle formed by the axes.

4. A constant velocity universal joint comprising a first member having a plurality of circumferentially spaced internal lands with conjoint internal segmental spherical surfaces formed on said lands, a second member having a plurality of circumferentially spaced external lands with conjoint external segmental spherical surfaces of smaller spherical diameter than the internal spherical surfaces of said first member, antifriction drive elements universally connecting said members for concurrent constant velocity rotation on normally different axes, antifriction centering elements simultaneously engaging the segmental spherical surfaces of both of said members for maintaining a common spherical center of the respective conjoint spherical surfaces, and an annular retainer retaining said drive elements in annular spaced relation in a single plane and retaining said centering elements in annular spaced relation in two separate planes parallel to and spaced on each side of said single plane, said retainer having an internal segmental spherical surface universally disposed on the conjoint external spherical surfaces formed on said second member and said annular retainer having a plurality of circumferentially spaced assembly notches formed in one side thereof and normally interspersed between said lands for permitting assembly and disassembly of said second member and said retainer.

5. A constant velocity universal joint comprising a first member having a plurality of circumferentially spaced internal lands, a second member having a plurality of circumferentially spaced external lands, a plurality of antifriction drive elements disposed between said lands of said elements and universally connecting said members for concurrent constant velocity rotation on normally different axes, and an annular retainer retaining said drive elements in a single plane, said retainer being universally secured on said second member about said lands and having a plurality of internal circumferentially spaced assembly notches normally interspersed between said lands but adapted for allowing passage of said lands during assembly and disassembly of said second member and said retainer.

6. A constant velocity universal joint comprising a first member having conjoint internal segmental spherical surfaces, a second member having conjoint external segmental spherical surfaces of smaller spherical diameter than the internal spherical surfaces of said first member, antifriction drive elements universally connecting said members for concurrent constant velocity rotation on normally different axes, and antifriction centering elements simultaneously engaging the segmental spherical surfaces of both of said members for maintaining a common spherical center of the respective conjoint spherical surfaces, and positive centering means operatively associated with said drive elements and said centering elements for maintaining said drive elements generally in a single plane perpendicular to the plane defined by the axes of said members and bisecting the angle formed by the axes.

7. In a hydraulic device having a rotating drive member and a rotatably driven member, the combination comprising antifriction drive elements universally connecting said members for concurrent rotation on normally different axes, retainer mechanism spacing said drive elements in a single plane, antifriction centering elements retained in spaced relation by said retainer and operatively associated with said members for universally centering said members and for guiding said retainer to maintain said single plane perpendicular to the plane defined by the axes of said members bisecting the angle formed by the axes, and positive centering means operatively associated with said retainer mechanism for acting in conjunction with said centering elements to maintain said single plane generally perpendicular to the plane defined by the axes of said members and bisecting the angle formed by the axes.

8. A constant velocity universal joint comprising a first member having conjoint internal segmental spherical surfaces and internal segmental annular grooves formed between said surfaces in planes intersecting the axis of said member and with centers common with the spherical center of said spherical surfaces, a second member having conjoint external segmental surfaces of smaller spherical diameter than the internal spherical surfaces of said first member, said second member having external segmental annular grooves formed between said segmental spherical surfaces in planes intersecting on the axis of said second member, and having centers common with the spherical center of said segmental spherical surfaces, antifriction drive elements disposed in opposing annular grooves of said members universally connecting said members for concurrent constant velocity rotation on normally different axes, antifriction centering elements simultaneously engaging the segmental spherical surfaces of both of said members for maintaining a common sperical center of the members, and positive centering means operatively associated with said drive elements and said centering elements for maintaining said drive elements generally in a single plane perpendicular to the plane defined by the axes of said members and bisecting the angle formed by the axes.

9. A constant velocity universal joint comprising a drive member, a driven member, antifriction drive elements universally connecting said members for concurrent rotation on normally different axes, retainer mechanism spacing said drive elements in a single plane, antifriction centering elements retained in spaced relation by said retainer and operatively associated with said members for universally centering said members, said antifriction centering members being adapted to maintain said single plane perpendicular to the plane defined by the axes of said members and bisecting the angle formed by said axes, and at least one guide finger having a central portion universally pivotally journaled in said retainer in said single plane and end portions universally pivotally journaled in the respective members for guiding said retainer in conjunction with said antifriction centering elements to maintain said single plane perpendicular to the plane defined by the axes of said members and bisecting the angle formed by the axes.

10. A constant velocity universal joint comprising a drive member, a driven member, antifriction drive elements universally connecting said members for concurrent rotation on normally different axes, an annular retainer retaining said drive elements in annular spaced relation in a single plane, and at least three guide fingers, each having a central portion universally pivotally journaled in said retainer in said single plane, and end portions universally pivotally journaled in their respective members for guiding said retainer to maintain said single plane perpendicular to the plane defined by the axes of said members and bisecting the angle formed by the axes.

References Cited in the file of this patent

UNITED STATES PATENTS

| | | |
|---|---|---|
| 1,924,017 | Bedford | Aug. 22, 1933 |
| 1,980,846 | Bradley | Nov. 13, 1934 |
| 1,985,278 | Bradley | Dec. 25, 1934 |
| 2,010,899 | Rzeppa | Aug. 13, 1935 |
| 2,389,186 | Dodge | Nov. 20, 1945 |
| 2,784,554 | Badalini | Mar. 12, 1957 |